March 19, 1973  J. M. ABALO  3,798,337

PROCESS FOR THE CONTINUOUS MANUFACTURE OF FOAMED SWEETS

Filed July 22, 1971  2 Sheets-Sheet 1

INVENTOR
Juan Manuel Abalo

BY Karl W. Flocks
ATTORNEY

United States Patent Office 3,798,337
Patented Mar. 19, 1974

3,798,337
PROCESS FOR THE CONTINUOUS MANUFACTURE OF FOAMED SWEETS
Juan Manuel Abalo, Buenos Aires, Argentina, assignor to Noel y Compania Limitada Sociedad Anoniam Argentian de Dulces y Conservas
Filed July 22, 1971, Ser. No. 165,064
Int. Cl. A23g 31/18; B29d 27/04
U.S. Cl. 426—279
13 Claims

ABSTRACT OF THE DISCLOSURE

Process and equipment for continuously manufacturing foamed sweets preferably sheathed with a noncellular shell by housing the foamable mass in a mold which may already include the shell, subjecting the foamable mass to progressive expansion by stepwise increasing vacuum in a moving sealed inclosure and then subjecting to high vacuum and simultaneous decreasing cooling.

BACKGROUND OF THE INVENTION

1. Field of the invention

The present invention relates to a process for the continuous manufacture of foamed sweets and more particularly this invention refers to a process for manufacturing sweets or candies having a shell, the outer face of which is substantially free of interruptions, said shell defining a space in which a foamed filler mass is housed, said sweet being of the type where the shell is made of a substantially cell free chocolate and the filler mass is made of a cell containing foamed chocolate, or of an alveolar mass formed of fatty materials and ground fruits and the softening point of which alveolar mass is similar to that of said foamed chocolate and capable of softening and fusing at the mouth temperature of a human being.

The present invention refers also to a system, machinery or equipment for carrying out the above referred to process as well as the candies or sweets obtained by said process and/or system.

The expressions "sweet" and "candy," for the purpose of this specification and the appendant claims is to be interpreted as meaning an edible product which is sweet and delicious to the palate.

The present invention is preferably used for the manufacture of chocolate products, specially chocolate tablets and therefore reference will mainly be made to chocolate, but this should not be interpreted in any limiting manner.

2. Description of prior art

The basic process for manufacturing foamed chocolate has been known for some thirty years and mainly consists in housing a flowable, pasty, warm chocolate mass including air or gas bubbles in a chamber or autoclave, where the pressure is progressively lowered, to thus increase the size of the bubbles, up to reaching a high vacuum which is maintained until the cholocate mass hardens, as the temperature of said mass decreases. To perform this known process an outstandingly large number of manually performed steps are necessary, such as filling the mold with molten chocolate, placing the molds in the autoclave or vacuum chamber, closing the chamber, decreasing the pressure in said autoclave, allowing the mold to rest in the autoclave until the chocolate mass has hardened, reincreasing the pressure in the autoclave in order to be able to open the latter and discharging the mold therefrom. Some of these autoclaves are provided with cooling systems in order to increase the speed of hardening the chocolate mass, but these cooling systems cool the entire autoclave space uniformly.

It can readily be understood that the production of the sweets which follow this process is expensive, not only as to labor costs, but also because the manufacture is slow and intermittent.

For several years it has been an aim in this field of the industry to replace said intermittent process by a continuous manufacturing process, but so far only a system having an automatic intermittent endless charge and discharge of the molds with regard to the autoclave has been achieved. While in the orthodox process the molds were charged into an open still standing autoclave and in the latter after having been closed and sealed the pressure was decreased and thereby the bubbles of the chocolate mass expanded in a progressive way, which as such had no drawbacks—except for the additional time required for producing the necessary vacuum after starting each operation—in the endless intermittent charging systems, where the additional time for producing the vacuum as just mentioned was eliminated, a new difficulty arose in that upon abruptly submitting the chocolate mass to a high vacuum, a sudden almost instantaneous expansion of the air bubbles took place, whereby in many circumstances part of the chocolate mass was splashed out of the mold and in addition, the resultant foamed chocolate contained many interconnected spaces instead of isolated cells. It is well known to those skilled in the art, that an outstanding feature of a properly foamed chocolate mass is that the wall members defining the cells have as small a thickness as possible and thereby melt easily in the mouth of the consumer. Upon the resulting foamed chocolate having large interconnected spaces, the thickness of the wall members increase accordingly, which is of course not desirable. Thus, in the process of manufacturing foamed chocolate, further improvements are desirable.

Although the foregoing are fundamental aspects in the manufacture of foamed chocolate, there are other concepts which have to be borne in mind, in order to be able to conceive a continuous manufacturing process of foamed chocolate, starting with the filling of a fused, flowable chocolate up to the station where the resulting product is packed.

In the manufacturing lines so far known for producing foamed chocolate, the vacuum station was coupled to known manufacturing line-sections already used for manufacturing other types of products, because the fundamental problems of a continuous manufacture had not been solved. In the following description, as far as these other manipulating steps are concerned, these will be described when reference is made to the preferred embodiments of the invention.

SUMMARY OF THE INVENTION

Thus, the basic concept of the present invention may be defined as referring to a process for the continuous manufacture of foamed sweets in molds, comprising the steps of pouring into a mold, at atmospheric pressure, a flowable, plastic, warm mass containing bubbles and which solidifies by cooling; locating the loaded mold into an isolated inclosure, the volume of which is only slightly larger than that of the mold; moving said inclosure towards a low vacuum zone, and during said movement towards said low vacuum zone allowing the heat of the warm mass to act on the bubbles to slightly increase their volume and thereby to also slightly increase the volume of the mass in the mold; introducing the mold with the inclosure into a low vacuum zone to produce an additional increase in volume of the bubbles and mass; and then introducing said mold into a high vacuum zone to substantially increase the volume of said bubbles and thereby the volume of said mass, at the same time as, at least, the free face of said mass is subject to an intense cooling to rapidly solidify a layer of said mass including said free face and forming a rigid dome including cells produced by said bubbles in said mass; decreasing thereafter the degree of cooling and allowing the mass to progressively solidify towards its core under the said high vacuum; thereafter discharging said mold from said high vacuum zone with the foamed, substantially solidified mass which has been allowed to solidify to a point only slightly above its softening point and which conveys to the mass a self-supporting characteristic; and thereafter discharging the resulting mass of sweet from the mold.

Upon manufacturing for instance a chocolate tablet according to the foregoing definition, the outer surface thereof will have recesses which decreases the aesthetical aspect of the product.

According to a more sophisticated method of the invention, the possibility is conceived to produce, by means of a continuous process, a chocolate tablet having an outer chocolate shell which is not foamed and which contains within the space defined by said shell a filler of foamed chocolate. In this event it is also possible to use as filler an alveolar mass which instead of being made of chocolate, is made of other products, as will be described later on.

Upon manufacturing a chocolate tablet having a chocolate shell, the process becomes more complicated in order to be able to produce said tablets by a continuous process. In this event it is important that the thickness of the shell be reduced to its minimum, so that the weight of the resulting tablet is not excessively increased, at the same time as special care has to be paid to the fact that both chocolate masses are well bonded to one another, without completely fusing the mass defining the shell during the bonding step, because this would destroy the smooth outer face of the resulting product.

Bearing in mind what has just been stated, the present invention refers likewise to a process for continuously manufacturing sweets having a shell, the outer face of which is substantially free of interruptions, said shell defining a space in which a foamed filler mass is housed, said sweets being of the type where the shell is made of substantially cell-free chocolate and the filler is made of cell containing or foamed chocolate, or of an alveolar mass formed of fatty materials and ground fruits and the softening point of which alveolar mass is similar to that of said foamed chocolate and capable of softening and fusing at the mouth temperature of a human being, comprising the steps of forming, at atmospheric pressure, in a mold which moves substantially continuously, a substantially bubble-free chocolate shell, solidifying and hardening by cooling said shell and then softening the inner face of said shell, pouring into the space defined by said shell a flowable filler mass including bubbles, said filler mass being at a temperature similar to that of the softened inner face of said shell, subjecting said mold with its mass first to a low vacuum to start the expansion of the bubbles in said filler mass and then to a high vacuum to increase the volume of said bubbles to form said cells at the same time as, at least, the free face of said filler mass is subject to an intense cooling to rapidly solidify a layer including said free face of said filler and producing a rigid dome in said filler mass, thereafter decreasing the cooling, progressively solidifying the rest of the filler mass in a direction towards its core, thereafter cancelling the vacuum and thereafter discharging the resulting sweet from the mold.

Within the process of the present invention for manufacturing the sweet, additional steps may be added both with regard to the manufacture of the chocolate shell in the mold prior to pouring the filler mass to form the foamed chocolate, as well as in connection with steps to follow after the mold has been discharged from the high vacuum chamber.

In the foregoing definitions the expressions "high vacuum" and "low vacuum," have been used.

For the purpose of the present specification and the appendant claims, the expression "high vacuum" is to be interpreted as referring to a vacuum which is generated in a chamber where the pressure has been substantially decreased with regard to the normal atmospheric pressure, to approximately 72 cm. Hg (the absolute vacuum being represented by 76 cm. Hg). The expression "low vacuum" is to be interpreted as referring to a vacuum range where the pressure is lower than the normal atmospheric pressure and is approximately 35 to 65 cm. Hg.

Obviously the process hereinbefore defined is carried out by means of a pertinent system, arrangement or equipment and although the majority of the devices used in such an arrangement are already known per se, the combination thereof represents a novel arrangement or equipment.

Analyzing now the invention from the equipment point of view, it is likewise possible to cast two types of definitions one relating to the basic equipment for manufacturing the foamed sweet and another one, which is already more sophisticated and which relates to an equipment for manufacturing a foamed sweet housed in a non-alveolar chocolate shell having a substantially uninterrupted or smooth outer face.

Thus, the present invention relates to an equipment for the continuous manufacture of foamed sweets in molds, said equipment comprising molds, a mold loading station for charging said molds with a flowable, plastic, warm mass containing bubbles and which solidifies by cooling, mold conveying means passing through said loading station, a high vacuum chamber having an inlet nozzle member and an outlet nozzle member, said conveyor means passing through said inlet nozzle member, high vacuum chamber and outlet nozzle member, said conveyor means including in the portions corresponding to said nozzle members spaced-apart sealing means allowing the housing of molds between them, the lengths of said nozzle members being larger than the distance existing between two sealing means, the inlet nozzle member, at the zone adjacent to said chamber, being connected to a low vacuum source and the zone of said chamber adjacent said inlet nozzle member including cooling sections arranged immediately above said conveyor means at a distance which substantially only enables the passing of said molds.

With regard to the more sophisticated concept of the invention as far as the equipment is concerned, it may be defined as relating to an equipment for continuously manufacturing sweets having a shell, the outer face of which is substantially free of interruptions, said shell defining a space in which a foamed filler mass is housed, said sweets being of the type where the shell is made of substantially cell free chocolate and the filler is made of foamed chocolate or of an alveolar mass formed of fatty materials and ground fruits and the softening point of which alveolar mass is similar to that of said foamed chocolate and capable of softening and fusing at the mouth temperature of a human being, and which comprises sweets shaping molds, each mold having a base portion integral with side wall portions and forming a filler inlet and a sweet shaping space, mold conveyor means adapted to convey said molds through said equipment which includes in succession a first shell forming chocolate loading station, a first scraper station adapted to scrape and clean said filler inlet and to level the shell forming chocolate mass housed in the mold with regard to said filler inlet, a first vibrating station adapted to vibrate said mold to substantially remove the bubbles contained in said shell forming chocolate mass, a fluid chocolate discharge station for discharging fluid chocolate from said mold, a first cooling station for said mold for hardening the remaining chocolate mass which remains attached to the side wall portions and base portion of the mold and which defines said shell, a first hot gas blower station directed towards the inside of said mold and adapted to soften the inner faces of said shell, a second chocolate loading station for pouring warm filler choclate adapted to form foamed chocolate at approximately the temperature of said inner faces of said shell into said shell, said inner faces of said shell being at a higher temperature than the outer faces of said shell, said second loading station including dosifying means capable of dispensing a predetermined volume of filler chocolate which is smaller than the volume defined by the inner faces of said shell, a high vacuum chamber having an inlet nozzle member and an outlet nozzle member, said conveyor means passing through said inlet nozzle member, high vacuum chamber and outlet nozzle member, said conveyor means including in the portions corresponding to said nozzle members spaced apart sealing means allowing the housing of molds between them, the lengths of said nozzle members being larger than the distance existing between two sealing means, the inlet nozzle member, at the zone adjacent to said chamber being connected to a low vacuum source and the zone of said chamber adjacent said inlet nozzle member including cooling sections arranged immediately above said conveyor means at a distance which substantially only enables the passing of said molds, and unloading means for discharging said molds from said discharge nozzle member.

With regard to said unloading means just cited, these consist actually of a series of devices which ensure that the final steps in the manufacture of the tablet or another product can be carried out with a minimum of products being discarded, prior to leading the resulting product to the packing station.

More particularly, upon the mold having been subject to the high vacuum, the filler mass forms a dome-shaped top which conveniently should be removed and flattened so as to form in the mold an upper free zone which may be filled with a layer of chocolate to thus obtain a lid which is welded to the rest of the sweet already manufactured, so that upon discharging the resulting sweet with the lid from the mold, the resulting end product will have a complete outer smooth appearance.

Upon describing the specific embodiments, further details will be forwarded with regard to the unloading means.

BRIEF DESCRIPTION OF THE DRAWINGS

In order to facilitate the comprehension of the details of the present invention, reference will now be made, by way of example to a preferred embodiment in relationship to the accompanying drawings, in which.

DESCRIPTION OF THE PREFERRED EMBODIMENTS

Figure 1A:
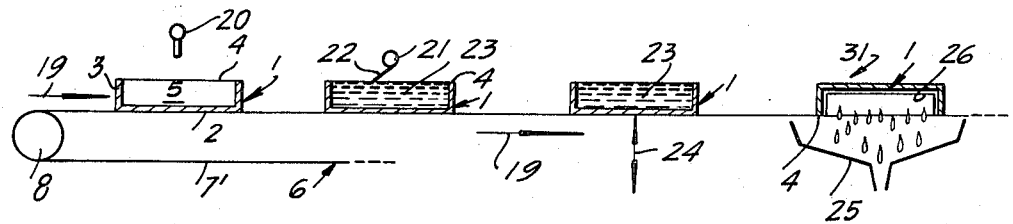
FIG. 1 consists in the drawings of the sum of FIGS. 1A+1B, and is a diagrammatic layout of the process and equipment and shows the several stations. Since the path of the circuit is continuous and the size of the sheets of the drawings does not allow to show the entire equipment in an uninterrupted way, the said circuit is cut into sections and the end of each section which continues with the next section is indicated by dotted lines. During the following description reference will mainly be made to FIG. 1.
Figure 1A:
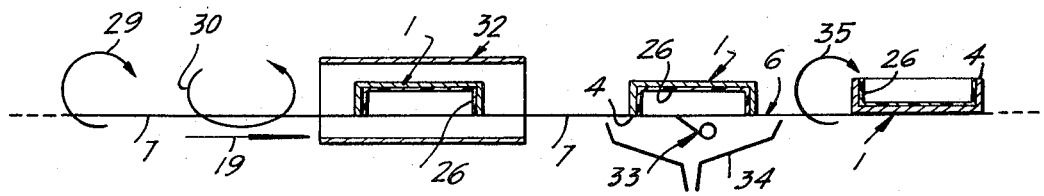
Figure 1A:
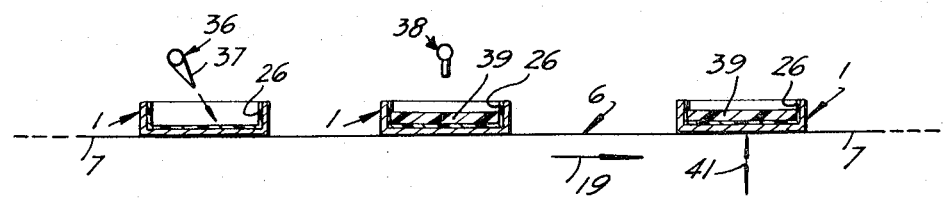
Figure 1A:
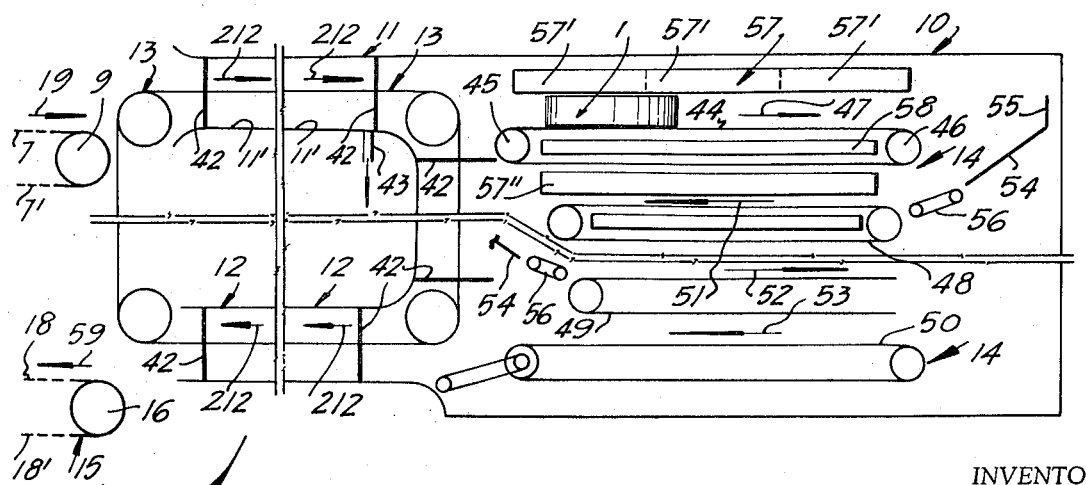

Upon now specifically referring to FIG. 1, the process of the present invention will be described in relationship to the equipment consisting of a plurality of pertinent devices.

In order to manufacture a chocolate tablet having a non-cellular chocolate shell and an inner cellular or foamed filler —where such tablet may for instance be in the form of a rectangular parallelepipedic—molds 1 are used having a base portion 2 and side wall members 3 defining an inlet 4 and a chamber 5.

It is advisable that the mold be of sturdy structure because during its path through the different stations it will be subject to a number of impacts as well as to frictions, as will be later seen. It is also an aim that the structure be such, that upon sliding along the runways of the inlet and outlet nozzle members of the high vacuum chamber, means are provided which reduce the frictional engagement to a minimum; but since the structural concepts of the molds do not form part of the present invention, no specific details will be forwarded in this specification, it being considered sufficient what has been hereinabove described and schematically shown in the pertinent drawings. On the other hand, a mold of the type hereinbefore described in connection iwth reference numerals 1 to 5, is as such known and may be used for the present invention, as will be readily understood by those skilled in the art.

From a theoretical point of view, it may be considered that the process and equipment of the present invention are divided into three zones, of which the first zone is a chocolate loading zone in which mold 1 passes through a series of stations and, at least generically, it may be considered that it is conveyed through said loading zone by means of a first endless conveyor 6 (FIG. 1), for instance a conveyor band or several endless chains, the upper length 7 of which is loaded with the molds 1. This first conveyor 6 is arranged between pulleys 8, 9. The lower length 7' of said first endless conveyor 6 is only shown in the portions adjacent to said pulleys 8 and 9, in order to avoid overloading FIG. 1.

The several end portions of the upper lengths 7 shown in FIG. 1 make use of the hereinbefore defined convention as to the dotted lines.

The second zone is the mass expanding and foaming or cell producing zone, where the high vacuum chamber 10, having the inlet nozzle member 11 and outlet nozzle member 12, is the main device.

A second endless conveyor 13 passes through the inlet nozzle member 11 and outlet nozzle member 12. In the high vacuum chamber 10 there is a third conveyor means 14 formed of several conveyors, as will be later explained and which is in transmission relationship with the inlet nozzle member 11 and outlet nozzle member 12.

Finally, the third zone is the discharge zone which is linked to the outlet nozzle member 12 and through which a fourth endless conveyor 15 passes. This fourth endless conveyor 15, similarly as the first endless conveyor 6, moves between the end pulleys 16, 27 defining the upper length 18 and the lower length 18'. Only the portions adjacent the pulleys 16 and 17, are shown of the lower length 18'. The same convention as used in connection with the first endless conveyor 6 as far as the dotted lines are concerned, is likewise used in connection with the fourth endless conveyor 15.

Returning now to FIG. 1A and with regard to the first zone, it may be appreciated that the molds 1 are moved through portions thereof with the inlet or mouth 4 directed upwardly and through other portions with the inlet or mouth directed downwardly. The end of the upper length 7 adjacent pulley 8 intermittently receives empty molds with the inlet 4 directed upwardly. The device for conveying the molds onto the upper length of the first conveyor is not shown and any supply arrangement of those known in the art may be used. The mold 1 is moved forward in the direction indicated by arrow 19 and moves first through a first chocolate loading station 20 where the chambers 5 of the mold 1 are completely filled with a first type of chocolate to form the shell of the sweet. To this end the nozzles 20 are provided with dosifiers (not shown) which as such are well known, in order to discharge predetermined quantities of chocolate each time a mold 1 is located underneath the nozzles of station 20. The chocolate mass is obviously poured into the mold in a fused and warm state and will have a suitable composition so as to include a minimum of bubles. In order to achieve this purpose, the proportion of fatty materials is smaller than in the chocolate mass to form the filler material, as will be later seen. The fatty materials may for instance be cocoa butter. Mold 1 is loaded in the first chocolate loading station 20 at atmospheric pressure and the temperature at which the chocolate is poured into the mold should be slightly above the melting point, usually approximately 29° C.

This temperature provides the chocolate with the necessary flowability to easily move into all the interstices or clearances of the mold 1. In FIG. 1 mold 1 is merely schematically shown so that these interstices are not illustrated, but in practice chocolate tablets may be formed by interconnected ribs and it is also a usual practice to provide the mold at certain portions with the manufacturer's name or a trademark which should finally appear on the finished product and which are of course further examples of those interstices, recesses or projections.

Mold 1, which was previously housed on the upper length 7 of the first endless conveyor 6, after having been loaded with chocolate at the first chocolate loading station 20 moves then through a scraping station 21 consisting of a resilient scraping blade 22 to eliminate the excess of the chocolate mass, and to clean the inlet 4 of mold 1, so that the mold is filled at level with a mass 23 to form the shell. The mold continues moving in the direction indicated by arrow 19, and passes through a first vertically vibrating station, as identified by reference numeral 24 having vertical vibrating means (not shown) where the vertical vibrations are predominant with regard to the horizontal forward moving direction 19 (vectorially speaking), whereby the air bubbles within the chocolate move towards the chocolate surface and are removed from mass 23.

During the movement of the mold 1 through these three stations 20, 21 and 24, the temperature of the chocolate mass 23 steadily decreases and the lowering of the temperature is obviously more pronounced in those zones of the mass 23 which are in contact with the inner faces of the mold 1. It has been determined that the time which is required to move the mold from the first chocolate loading station 20 through the first vertically vibrating station 24 is sufficient to produce a thin chocolate layer which remains stuck to the inside walls of mold 1. Upon mold 1 reaching the next station it is turned round through 180°, so as to be mouth downward, whereby the main portion of the chocolate mass is discharged into funnel 25, but a chocolate layer to define the shell 26 remains in the mold.

If the mold 1 is of a subdivided or partially subdivided type, such as to form a chocolate tablet made of ribs, where the mold, apart from the inlet defined by band-like zones has semicylindrical recessed portions, then there is a tendency of forming at the crests of adjacent semicylindrical recessed portions, solidified pin-like chocolate projections or stalactites, which must be eliminated. In order to achieve this, the mold is rotated in a rotating station 29 through 360°. This rotating station is not necessary in all the cases. In some circumstances, particularly where the molds are to provide fancy shaped molded products, it may be advisable to likewise insert a centrifuging station 30 which may follow the excess chocolate discharge station 31 or may be located between the latter and the first vertically vibrating station 24.

Mold 1 either after having left the excess chocolate discharge station 31 or after having passed through the rotary station 29 and/or the centrifuging station 30, continues its movement in the direction of arrow 19, mouth downwardly and is passed through a first cooling tunnel 32 forming part of a chocolate hardening station for the shell 26. Upon the mold passing through this tunnel, the temperature of the shell 26 is lowered to 20° C. or less. Due to this decrease in temperature the shell chocolate is maintained in the mold, although the mold being conveyed mouth downwardly. The thickness of the shell chocolate 26 has to be sufficient to be able to suitably contract upon being subject to lower temperatures so as to facilitate the discharge of the finished tablet from the mold 1, as will be later seen.

The thickness of the shell 26 depends on the size of the tablet which is being manufactured, so that no specific data are given.

Mold 1 continues its movement, always mouth downwardly, in the direction indicated by arrow 19 through a second scraping station 33 to scrape off any remaining chocolate existing on the top defining the inlet 4 and the scraped off chocolate is collected in a tray 34 arranged below the upper length 7 of the first endless conveyor 6. Precisely because the mold 1 is moved mouth downwardly, it is assured that none of the scraped off chocolate particles fall back into the mold.

Obviously the chocolate collected in funnel 25 and tray 34 is sent back to a refusing station (not shown) to be again used at the first chocolate loading station 20.

The mold 1 is then conveyed towards a second rotating station 35 where it is turned through 180° to have the mold again mouth upwardly. It is to be borne in mind that at this stage of the process the shell chocolate 26 is rather hard, being at a temperature of approximately 20° C. and if at that temperature another chocolate, such as the filler chocolate mass 39 were charged into the mold at approximately 29° C., the difference in temperature existing between the inner face of the shell chocolate 26 and the filler chocolate would not assure a good welding between both chocolate masses; however, a good welding is an aim and necessity for the finished product.

It is therefore advisable to pass the mold 1 along a first hot gas blower station 36 having an ejector nozzle 37, the ejection axis of which is directed towards the inner face of the shell 26 and which defines the space into which the filler chocolate is to be poured. The air or gas to be ejected by nozzle 37 should be at approximately 30° C. so as to soften the inner face or faces, and to increase the temperature thereof to approximately the same temperature as that of the filler chocolate to be charged in the next station, which is the second chocolate loading station 38. The amount of filler chocolate 39 to be filled into the mold 1 has to be dosed in a precise way, so that when the filler chocolate is being expanded it will not overflow the mold 1. The volumetric proportion that the filler chocolate will expand depends on the constitution of the chocolate, and more particularly upon the proportion of the fatty components contained therein. The principle is, the more fatty components are contained in the chocolate mass, the more air bubbles are generated. It is impossible to establish a fixed relationship of the weight of the shell chocolate with regard to the filler chocolate due to the existence of a large number of variables. This is empirically fixed by tests. The most important variables are the following:

(1) The shape of the bottom or base portion of the mold; if it is not flat such as base portion 2, then the heights of the different portions of the filler material are not all equal. Those portions which define larger heights have a tendency to expand more, since more air bubbles are formed in these theoretical columns, than the portions of less height.

(2) Another variable is the volume of the mold. The larger the volume of the mold, the larger is the tendency that the central portion of the filler material will expand more, thereby tending to form during the expanding process an arcuate dome shaped top 40 (such as shown at the beginning of FIG. 1B, where the mold 1 is located on the upper length 18 of the fourth endless conveyor 15). The height of this dome shaped top 40 must however be well controlled for reasons to be explained later on. In fact the longer the filler mass takes in solidifying throughout its entire mass or body, the more the air bubbles expand in the vacuum chamber 10 where the cooling and solidifying takes place. The central portion of the body of the filler mass is the last one which solidifies and thereby the expanding process tends to continue there for a longer period.

(3) Another variable is the temperature of the shell chocolate mass 26. The lower said temperature is at the moment of pouring the filler chocolate into the mold, the more pronounced is the tendency of cooling the layer of filler chocolate immediately adjacent the shell chocolate, thereby crystallizing this layer of the filler chocolate and barring it from expanding in the expansion process; obviously this is something which ought to be avoided since otherwise the thickness of the resulting chocolate shell becomes undesirably large and would take longer to dissolve in the mouth of the consumer.

(4) Finally, the temperature of the filler chocolate, when being poured into the mold at the second chocolate loading station 38, is also a variable because the higher said temperature is, the longer it takes to cool and solidify the filler material in the vacuum chamber 10, as will be better understood later and thereby the manufacturing time for processing the chocolate tablet would undesirably increase.

Once the filler chocolate mass 39 has been filled into the mold 1 up to a suitable height, the mold 1 continues its movement on the first endless conveyor 6 in the direction indicated by arrow 19 towards a second vertically vibrating station 41, wherein the vertical vibrations are of minor magnitude compared to those of the first vertically vibrating station 24.

These vertical vibrations in station 41 have a smaller magnitude than the horizontal movement, and are performed in order to assure a correct flowing of the filler chocolate 39 throughout the mold, without excessively discharging the air bubbles.

Although in the equipment so far described, mold 1 is conveyed by a single endless conveyor 6, the latter may be replaced by several successive conveyors, as will be obvious to those skilled in the art. Once the mold has passed the second vibrating station 41, it is transferred to the second endless conveyor 13. Generally speaking, the second endless conveyor 13 passes through inlet nozzle member 11 to convey the molds 1 from outside into the high vacuum chamber 10 and there the molds are transferred to the third conveyor means 14. After the molds have passed through said third conveyor means 14, they are returned to the second endless conveyor 13 to be discharged through the outlet nozzle member 12 and onto the fourth endless conveyor 15. As has already been stated above, high vacuum chambers wherethrough molds are sent in an intermittent way, in order to produce foamed chocolate, are already known. These chambers have an inlet nozzle member and an outlet nozzle member through which mold conveyors pass and these conveyors are provided with sealing means which seal the inside of the vacuum chamber from the outside. Thus, in the high vacuum chamber the low pressure may be maintained with the use of a small vacuum pump to compensate leakages. In spite of the fact that this general concept is already known, the present invention includes improvements in connection therewith.

More particularly, the height of the nozzle members 11 and 12 should be as small as possible; actually the small height requirement applies only to the inlet nozzle member 11, but from a structural point of view the outlet nozzle member 12 should have the same cross-sectional area in order to ensure a good sealing contact during the discharge. The sealing means consisting of partitions are arranged on the chain 13 and these sealing means are spaced apart at a distance slightly larger than the length of each mold. The sealing means 42 are shown in a schematic way. Once mold 1 is housed on the bottom surface or runway 11' of the inlet nozzle member 11, said mold becomes housed between a pair of sealing means 42 thus defining an inclosure, i.e. a space sealed from outside, which will move towards the high vacuum chamber 10 and the heat contained in the filler chocolate mass 39 starts to slightly expand the bubbles contained in said mass 39.

Furthermore, bearing in mind that in the high vacuum chamber 10 there is a high vacuum of approximately 72 cm. Hg—the absolute vacuum being represented by 76 cm. Hg—said high vacuum chamber 10 exerts a suctioning effect on the sealing means 42 and since there are always small leakages, the pressure in the moving inclosures defined between each pair of sealing means 42 is decreased, as they move towards the vacuum chamber 10 and thus the air bubbles in the filler chocolate 39 start to increase in size and the level of the filler chocolate starts to rise. Accordingly, the height of the filler chocolate which is charged at station 38 should be such that it does not start to enter into frictional contact with the roof of the inlet nozzle member 11, when moving therethrough. The vacuum which is produced in vacuum chamber 10 is of course of the controllable type and may be varied, to assure that the filler chocolate will not touch the roof of inlet nozzle member 11. It will be understood that as the inclosure defined between a pair of sealing means 42 moves through the inlet nozzle member 11 towards the vacuum chamber 10, even if the pressure is being slightly decreased, there would be a sudden substantial large decrease in pressure the moment these moving inclosures establish connection with the vacuum in the vacuum chamber 10 and accordingly an almost instantaneous and abrupt expansion of the filler chocolate mass 39 would take place whereby an undesirable tendency would be created that chocolate splashes out of the mold. This would provide problems, in staining and eventually clogging the pertinent mechanical devices and at the same time the production of the chocolate tablets would not be uniform, i.e. the weight of the different chocolate tablets would vary out of admissible ranges. To avoid this it is necessary to decrease the pressure of the moving inclosures in the inlet nozzle member 11 as these inclosures approach the vacuum chamber 10, so that the decrease in pressure in the moving inclosures upon establishing the contact with the vacuum chamber 10 remains within admissible limits and no splashing takes place. To this effect at least one additional suction pipe 43 is provided within the inlet nozzle 11 and preferably near the chamber 10, which suction pipe decreases the pressure in each of the inclosures to an intermediate pressure (about 35 to 65 cm. Hg) between that existing in the inclosure before reaching the suction pipe 54 and that in the high vacuum chamber 10 prior to establish connection with said chamber 10.

The second endless conveyor 13 transfers the mold into the high vacuum chamber 10, always mouth upwardly, i.e. with the inlet 4 directed in upward direction, to the third conveyor means 14 consisting of a plurality of endless, superposed conveyors, so that each mold moves along said conveyors and is lowered, as will be later seen, from the uppermost conveyor through the intermediate conveyors to the lowermost conveyor to be finally discharged from the high vacuum chamber 10 through discharge nozzle member 12 by the second endless conveyor 13.

Referring now to the high vacuum chamber 10 in detail, the mold 1, once the moving inclosure defined by a pair of sealing means 42 housing the mold has entered the high vacuum chamber 10, is transferred to the uppermost endless conveyor 44 which moves around pulleys 45 and 46 and defines the uppermost floor of the vacuum chamber 10. The chocolate mass and particularly the filler mass 39 increases its temperature upon the pressure decreasing and thereby the air bubbles contained in the filler mass 39 increase in size. It is now necessary to decrease the temperature of the chocolate in order to solidify it, so that the cells formed by the bubbles are maintained without the different cells interconnecting, which interconnection would form big holes within the tablet, which is not permissible.

On the other hand, it is an important aim of the industry to provide a vacuum chamber, the length of which is reduced to an admissible minimum. A vacuum tunnel which would be excessively long on the order of 100 or more meters implies outstanding problems for producing an adequate vacuum and the necessary cooling to maintain the arrangement at a suitable temperature. The advantage of having a long tunnel would be that the mold will not be subject to any shocks, inasmuch as it moves smoothly forward and thereby the cooling of the chocolate mass could be carried out gradually. However, as has been stated, this is not feasible in practice, so that it has been conceived to move the mold zig-zag like downwardly through several floors, of which the uppermost floor is defined by conveyor 44 moving in the direction shown by arrow 47 and thereafter there are successive lower floors defined by conveyors 48, 49 (only partially shown) to end finally in the lowermost floor, i.e. conveyor 50. Arrows 51, 52 and 53 show the direction of movement of the mold. Thus the required cooling lengths of 100 or more meters is achieved. In practice there may be ten to twelve or more floors, depending on the length of the vacuum chamber 10. The length of the vacuum chamber is dictated by the following concepts:

When the mold 1 moves along the uppermost floor conveyor 44, in the direction indicated by arrow 47, the cooling must be sufficient so that the layer including the upper face of the filler chocolate mass and which may be dome shaped, identified by reference numeral 40 (already previously mentioned), becomes sufficiently solidified as to confer to said layer combined with the shell 26 a self-supporting feature. When the mold reaches the neighborhood of pulley 46, it moves further forward until falling onto the transfer tray 54 which is sloped and has as a forward end an upstanding abutment wall 55. Accordingly, the front end of the mold has to enter in abutting contact with wall 55 and thereupon the direction of movement is inverted and thus the mold 1 starts to slide the sloped transfer tray 54 downwardly onto an intermediate conveyor 56 and therefrom onto the next lower floor conveyor 48, which moves in opposite direction to the top floor conveyor 51. The mold moves always mouth upwardly. The intermediate conveyor 56 moves at a higher speed than the pertinent floor conveyors 44, 48, 49, 50 to be sure that each mold is conveyed with a fast movement onto the next lower floor conveyor, thereby avoiding an overlapping of molds within the zone of each transfer tray 54.

It will be understood that the impacts to which the mold is subject, upon entering in abutting contact with abutment wall 55 is of certain importance and it is therefore necessary that the upper portion 40 of the solidified filler chocolate, resists this impact without breaking. Furthermore, it has to be borne in mind that an additional impact although of smaller magnitude, takes place when the mold falls from the conveyor onto the sloped tray 54 and therefrom through the intermediate conveyor 56 onto the next lower horizontal conveyor. Although not specifically shown in the drawing, it will be obvious to those skilled in the art that each floor conveyor is provided with the necessary transfer devices at each of its ends.

In the vacuum chamber, there is practically no air capable of acting as a convection cooling agent. It is however necessary to cool the chocolate mass during its movement along the uppermost floor conveyor 44 so as to achieve the above referred to self-supporting feature before the mold arrives at roller 46. The cooling of the mold must be performed by radiation and therefore it becomes necessary to arrange above the conveyor 44 and at a distance which is reduced to the minimum possible expression with regard to the inlet 4 of the mold 1, a cooling plate arrangement 57. This cooling plate arrangement consists of a plate having a cooling coil inside it, through which cooling water at a temperature of 4° to 5° C. runs. It is convenient to divide said cooling plate arrangement into several sections 57', so that the cooling water has to run through short paths and thereby increases the cooling effect on the chocolate mass, particularly bearing in mind the poor heat transfer which exists in a vacuum chamber. In addition, this cooling arrangement is particularly conceived for preferentially cooling the upper layer of the filler chocolate mass which is accessible through the inlet 4.

Furthermore, it is convenient to arrange an additional cooler device for cooling the ambient in general inside the vacuum chamber 10, as is already known, such as by arranging cooling plates 58 below the upper lengths of the upper conveyors. These cooling plates 58 need not to be subdivided since they should not provide a direct cooling action on the chocolate.

From the foregoing it is also apparent that an important aspect to be borne in mind in connection with the vaccum chamber is to control the temperatures within the space defined by chamber 10 to ensure that the filler chocolate mass does not fuse the shell 26 and also to control the expansion of the filler mass 39 to ensure that the upper face thereof does not enter into frictional contact with the cooling plate 57. Thus the filler chocolate mass enters the vacuum chamber 10 at an average temperature between 29° C. and 30° C. and the upper zone of chamber 10, that is to say the portion above the uppermost endless conveyor 44, is at a temperature of 5° C. to 8° C. in order to achieve the desired hardening of the upper layer of the filler chocolate 39. Accordingly, the length of the vacuum chamber is in direct relationship with these requirements.

It is not possible to establish more specific ranges since these depend basically on the following facts: the weight of the chocolate tablet to be manufactured; the vacuum existing in the vacuum chamber 10; the temperature existing within the vacuum chamber 10; the temperature of the filler chocolate 39; the speed with which the mold 1 moves through vacuum chamber 10 and the proportional content of fatty material in the filler chocolate according to which a larger or smaller amount of bubbles are produced. As a general concept it may be borne in mind that the smaller the weight of the filler chocolate, the larger the vacuum must be and the larger the weight of the filler chocolate, the more intense the refrigerating effect must be and/or the speed with which the molds are moved through the vacuum chamber must be decreased.

The intermediate conveyors 48 which follow immediately below the upper most endless conveyor 44 shall likewise be provided with cooling plate arrangements 57''. Usually three or four floors are provided with these cooling plate arrangements and more particularly the cooling plate arrangements will be provided to as many floors as there are necessary to ensure that the filler chocolate mass becomes self-supporting throughout its entire body. The next lowermost intermediate floors, such as those graphically indicated by endless conveyor 49, do not have any refrigerating arrangement so that as the molds run through these intermediate floors, the structure of the chocolate mass stabilizes.

Thus, the temperature in the vacuum chamber 10 increases progressively in a downward direction, that is to say that at the height corresponding to these intermediate floors, there will be a temperature in the range of 14° C. to increase up to some 21° C. in the zone corresponding to the lowermost conveyor 50.

Thus, as the temperature of the chocolate in the molds decreases, the temperature of the vacuum chamber increases, which further stabilizes the cell structure in the chocolate.

The mold is then discharged by transferring it, always mouth upwardly from conveyor 50 to the second endless conveyor 13, moving through the outlet nozzle member 12. Since the chocolate when leaving the vacuum chamber 10 has a temperature of approximately 21° C., as the pressure increases in the inclosures formed by pertinent pairs of sealing means 42, the temperature of the chocolate mass likewise increases up to approximately 28° C. The chocolate mass is capable of maintaining its self-supporting structure at a temperature of approximately 28° C. and thus upon the mold with its mass entering the zone of atmospheric pressure, the temperature of the chocolate will be maintained and it is possible to further manipulate the chocolate mass which is relatively soft, in optimum conditions during the next steps to follow.

Figure 1B:
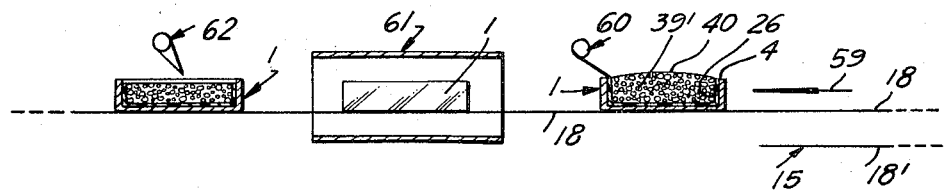
Figure 1B:
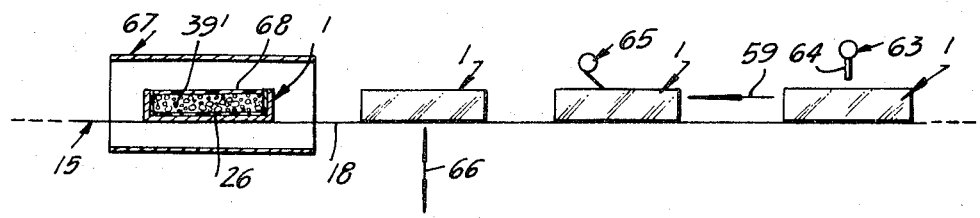
Figure 1B:
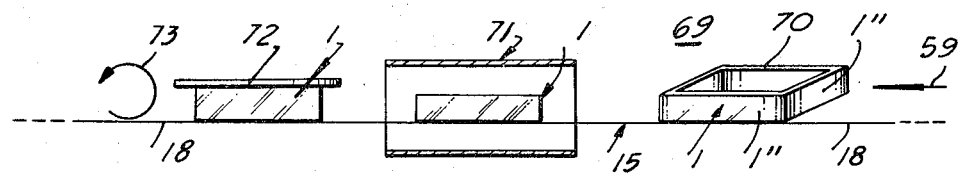
Figure 1B:
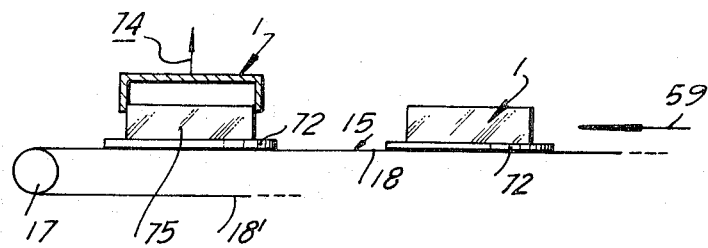

As can be appreciated from the end portion of FIG. 1A, the mold which exits from the outlet nozzle member 12—being conveyed by the second endless conveyor 13—is transferred to the fourth endless conveyor 15 and more particularly to the upper length 18 adjacent pulley 16. The fourth endless conveyor 15 moves in the direction indicated by arrow 59. The mold 1 houses in its space the shell chocolate 26 and the foamed solidified filler chocolate 39' (FIG. 1B), the upper portion 40 of which is usually dome shaped. This dome shaped top 40 may project out of the inlet 4 so that it becomes necessary to cut off the excess, to which end the mold 1 is passed through a third scraping station 60 to cut off the excess of chocolate. Bearing in mind that the chocolate mass leaves the outlet nozzle member 12 at approximately 28° C., the excess portion may be cut off smoothly and without generating in the chocolate mass undesirable grids or cracks.

Once this step has been concluded, it is advisable to pass the mold 1 through a second cooling tunnel 61 in order to start an initial shrinking of the chocolate mass within the mold, which will facilitate the latter discharge of the tablet from the mold and which also provides an additional increase in hardness of the upper chocolate layer which has just been scraped and/or cut.

The mold 1 is then, always with the inlet upwardly directed, passed through a second hot gas blower station 62—adapted to eject air or gas at approximately 30° C.—in order to soften the top face of the filler chocolate to facilitate the welding of the chocolate mass, which will be ejected through nozzle 64 at the third chocolate loading station 63 to form the chocolate lid 68. This chocolate mass is ejected through nozzzle 64 at 29° C. to 30° C.

The mold is then passed through a fourth scraping station 65 to level the lid layer and thereafter the mold 1 is subject to a vertical vibration at the third vibrating station 66 to eliminate bubbles contained in the chocolate mass to form the lid.

The mold is then passed through a third cooling tunnel 67 to harden the chocolate mass forming the lid 68.

Once the mold is passed through the third tunnel 67, it is subject to a thorough cleaning in a final scraping section 69, where the entire upper edge 70 defining the inlet as well as the side faces 1'' are cleaned. The scraping tools are not shown in station 69, since they are well known. It is important that during this cleaning step any chocolate linkage which may have existed between the chocolate mass to form the sweet and the surfaces 70 and 1' is removed in order to facilitate the discharging of the sweet from mold 1.

To this end the mold is first passed through a fourth cooling tunnel 71 where the temperature is quite low, round about 4° C., to achieve, within admissible limits, a maximum shrinkage of the sweet within mold 1.

Upon mold 1 emerging out of the fourth cooling tunnel 71, a cover member 72 is fitted on the mouth of the mold 1, the mold is then turned round and at third rotating station 73, so that the cover member 72 rests on the upper length 18 of the fourth endless conveyor 15.

The mold is then subject to the last station, more particularly to the mold raising station 74, where the mold 1 is raised so that the finished sweet 75 may now be conveyed towards the packing station (not shown).

Bearing in mind the last steps which have just been described, it will be evident to those skilled in the art that each mold is passed rather fast through stations 73 and 74, so that the low temperature of the sweet 75 is maintained and thereby the above explained shrinking features will assure that the mold may be easily raised from the sweet 75. The sweet 75 is thus completely covered by a nonalveolar or substantially cell-free chocolate mass which improves considerably the aspect of the product.

The composition of the filler mass 39 may be varied, for instance white chocolate or a chocolate having a different color from that of the shell chocolate may be used. It is also possible to replace the filler chocolate mass, as has been stated at the beginning of the specification, by a filler mass formed of other ingredients, such as for instance dry fruits of the type containing a high percentage of fatty materials, such as 50% to 60%. Suitable fruits are nuts, almonds, hazelnuts, peanuts, Cajú chestnuts, etc. In other words, fruits having a rind are the preferred ones and these fruits are then toasted to eliminate the excess of humidity from the fruit and to change and develop the flavor of the fruit.

The fruit is then crushed, whereby the rind separates from the fruit core, because during the toasting process the fruit shrinks and the rind which was already dry becomes thereby separated from the fruit.

The crushed fruit and rind are passed over sieves with blowers so that the more heavier fruit particles pass through the sieves and the lighter rind particles are blown away. This process is repeated through several mesh decreasing sieves, until the rindless crushed fruit particles remain only. These are then passed through grinding cylinders to form a pasty mass, the fatty materials are thereby pressed out of the fruit particles. This pasty mass is not capable of solidifying at the chocolate solidifying temperature which is between 29° and 30° C. so that it becomes necessary, in order to use this mass as a filler, to add thereto other fatty materials, whereby the mixture lowers its melting point, so that the mixture will solidify at the desired 29° to 30° C.

Fat containing products which may be added are cocoa butter or other hydrogenated fatty materials, such as whale oil, the oil of the seeds of the palmfruit and the like, which fatty products have to be subject first to a process for removing the pertinent flavors thereof and which process is already known.

At the same time as the fatty material is added, fine sugar, preferably confectioner's sugar is added, and the proportion is ⅓ of additional fatty material to ⅔ of the previously prepared pasty material. Sugar is added in a proportion depending on the taste of the particular country.

This combination is refined, that is to say passed through a pair of rollers in order to form a well developed, i.e. intermixed, mixture which constitutes the filler material. All these steps are carried out at room temperature and it is obvious that the resulting filling material has to be heated up to a suitable temperature, such as 29° C. before filling it into the shell covered mold at the second loading station 38.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What I claim is:
1. A process for the continuous manufacture of foamed edible sweets in molds, comprising the steps of
   pouring into a mold, at atmospheric pressure, a flowable, plastic, warm mass of the edible sweet material containing bubbles and which solidifies by cooling, said mass having a free face,
   passing the loaded mold into a movable, substantially pressure-isolated inclosure, the volume of which is only slightly larger than that of the mold,
   moving said inclosure containing said mold to a source of low vacuum, and at said source providing low vacuum within said inclosure to thereby produce a first expansion in volume of the bubbles and mass, moving said inclosure with said mold away from said source of low vacuum and directly passing said mold into a high vacuum zone to subject said mold to said high vacuum and to substantially increase the volume of said bubbles and thereby the volume of said mass while substantially avoiding the coalescence of bubbles, the sequential vacuum treatment of the mass at first low and then high vacuum being sufficient to avoid the splattering of the mass out of said mold, immediately intensely cooling the free face of said mass while under said high vacuum to rapidly solidify a layer of said mass in the form of a rigid dome at said free face including cells produced by said bubbles in said mass, continuously cooling said mass to progressively solidify the mass under the said high vacuum, decreasing thereafter the degree of cooling in an amount sufficient to permit said mass to warm from its surface inwardly to a temperature slightly below the melting temperature of said mass while maintaining vacuum, thereafter discharging said mold to the atmosphere, and thereafter discharging the resulting mass of sweet from the mold.

2. A process for the continuous manufacture of sweets in molds, said sweets having a shell, the outer face of which is substantially free of interruptions, said shell defining a space in which a foamed filler mass is housed, said sweets being of the type where the shell is made of substantially cell-free chocolate and the filler is made of a cellular mass selected from the group consisting of chocolate and the mixture of fatty materials and ground fruits, the softening point of which is similar to that of said chocolate and capable of softening and fusing at the mouth temperature of a human being, comprising the treatment steps of first forming said shell by pouring molten chocolate at atmospheric pressure into said mold which moves substantially continuously, removing substantially all bubbles from said molten chocolate, forming from said chocolate in said mold a shell defining a space, solidifying and hardening by cooling said shell and then softening the inner face of said shell, pouring into the space defined by said shell said flowable filler mass and having bubbles therein and which bubble containing filler mass is capable of forming a foamed filler mass within said shell, said filler mass being at a temperature similar to that of the softened inner face of said shell, said filler mass having a free face, passing said mass in said shell into a movable, substantially pressure-isolated inclosure, the volume of which is only slightly larger than that of said mold, and therein subjecting the mass within said shell to a low vacuum to produce a first expansion of the bubbles in said filler mass, then directly moving said mass in said shell to a high vacuum zone and subjecting the mass to a high vacuum to produce a second expansion to increase the volume of said bubbles to form said cells thereby avoiding the coalescence of bubbles, the sequential treatment of the mass at first low and then high vacuum being sufficient to further avoid the splattering of the mass out of said mold, simultaneously subjecting said mass to an intense cooling while under said high vacuum to rapidly solidify said free face of said filler mass to produce a rigid dome in said filler mass, thereafter decreasing the cooling rate, progressively solidifying the rest of the filler mass in a direction towards its core, thereafter cancelling the vacuum and thereafter discharging the resulting sweets from the mold.

3. The process of claim 2 wherein the high vacuum zone defines a zig-zag path for said mold through superposed vertically spaced zones, the first and uppermost of said zones, adjacent the zone where low vacuum is produced having a refrigerating source for creating a surrounding temperature of 5° to 8° C. and which is closely spaced above the top of the molds moving through said first uppermost zone, the temperature in said high vacuum zone increasing from said uppermost zone towards the lowermost zone which is at a temperature of approximately 21° C., the molds being then discharged from said high vacuum zone through a low vacuum zone where the mass contained in the mold is allowed to increase its temperature up to below the softening point of said mass to maintain its self-supporting feature.

4. The process of claim 2, wherein said treatment steps are divided into a first mold loading zone where the steps are performed at atmospheric pressure, a second mass expanding and foaming zone where the steps are successively performed at low vacuum and high vacuum and a third mold discharge zone where the steps are performed at atmospheric pressure, and where in said first zone the mold is first completely charged with its inlet upwardly directed, with a first type of chocolate at approximately 29° C. to form said shell, said mold is then subject to scraping to eliminate excess of chocolate, said chocolate mass is then subject to first vibrations to eliminate the bubbles contained in said chocolate mass, the flowable chocolate mass which remains in said mold is then discharged from said mold to maintain in said mold a shell adhered to the inner walls of said mold formed by the remaining chocolate mass which has already hardened.

5. The process of claim 4, wherein prior to discharging said flowable chocolate mass, the mold is subject to centrifuging.

6. The process of claim 4, wherein the mold with its shell is subject to cooling, to decrease the temperature of said shell to at least approximately 20° C., and thereafter the inlet of said mold is subject to a cleaning action by scraping with the inlet of the mold directed downwardly, the mold is then turned so that its inlet is upwardly directed and then the inner face of said shell is subject to softening by using a hot gas stream at approximately 30° C.

7. The process of claim 4, wherein after having poured said filler mass into said space defined by said shell, the mold is subject to second vibrations of smaller magnitude than said first vibrations in order to ensure that the filler mass enters all the interstices formed by the space defined by said shell but without excessively discharging the air bubbles, thereafter the mold is housed in a moving inclosure where the pressure is gradually decreased as said inclosure moves through the low vacuum zone which forms part of said second zone.

8. The process of claim 4, wherein the discharge of the still flowable chocolate mass is achieved by turning round said mold so that its filler opening opens downwardly.

9. The process of claim 8, wherein after having discharged the flowable chocolate mass, the mold is subject to centrifuging.

10. The process of claim 8, wherein the mold is rotated after the flowable chocolate mass has been discharged, through 360° to eliminate the existence of any hardened stalactites.

11. The process of claim 4, wherein in said third zone the mass of said mold is first subject, with the inlet of said mold upwardly directed, to a size reducing action in order to form an upper zone for receiving an additional charge of flowable chocolate and the accessible surface of said mass prior to receiving said additional flowable chocolate is subject through said inlet of said mold to a softening action to soften the surface layer of said mass accessible through said inlet of said mold, a flowable liquid chocolate mass is discharged into said mold at a temperature of approximately 29 to 30° C. in order to produce a lid for said shell capable of welding with the softened layer of said mass.

12. The process of claim 11, wherein prior to the softening of the accessible surface of said mass the latter is subject to refrigeration to increase its hardness.

13. The process of claim 11, wherein the mold is thereafter subject to scraping and cleaning and thereafter to vibration to remove bubbles which may be present in said chocolate mass to form said lid and thereafter said mold is subject to cooling, to harden the mass to form said lid and to shrink the resulting mass to facilitate the discharge thereof from said mold.

References Cited

UNITED STATES PATENTS

| | | | |
|---|---|---|---|
| 3,532,064 | 10/1970 | Kreber et al. | 425—407 X |
| 2,278,467 | 4/1942 | Musher | 99—128 X |
| 2,082,313 | 6/1937 | Todd | 99—138 R |
| 1,843,522 | 2/1932 | Sprague | 99—472 |
| 941,537 | 11/1909 | Savy | 425—407 X |
| 1,276,006 | 8/1918 | Bausman | 99—450.6 X |
| 2,896,557 | 7/1959 | Aasted et al. | 99—138 |
| 3,545,981 | 12/1970 | Klein et al. | 99—138 R |
| 3,711,300 | 1/1973 | Forkner | 99—138 R |
| 3,577,360 | 5/1971 | Immel | 264—101 X |
| 3,541,639 | 11/1970 | Enicks | 425—4 C |
| 3,615,593 | 10/1971 | Patil | 99—138 R |
| 3,468,990 | 9/1969 | Odell | 264—50 X |

TIM R. MILES, Primary Examiner

S. L. WEINSTEIN, Assistant Examiner

U.S. Cl. X.R.

99—450.6, 472; 264—45, 101; 425—405 R, 817 R; 426—163, 515